US00RE49566E

(19) United States
(12) Reissued Patent
Rao et al.

(10) Patent Number: US RE49,566 E
(45) Date of Reissued Patent: Jun. 27, 2023

(54) ADJUSTING TRANSMIT POWER ACROSS A NETWORK

(71) Applicant: Parallel Wireless, Inc., Nashua, NH (US)

(72) Inventors: Prashanth Rao, Wilmington, MA (US); Murali Talluri, Shirley, MA (US); Kaitki Agarwal, Westford, MA (US)

(73) Assignee: Parallel Wireless, Inc., Nashua, NH (US)

(21) Appl. No.: 16/436,072

(22) Filed: Jun. 10, 2019

Related U.S. Patent Documents

Reissue of:
(64) Patent No.: 10,142,948
Issued: Nov. 27, 2018
Appl. No.: 15/438,641
Filed: Feb. 21, 2017

U.S. Applications:
(63) Continuation of application No. 14/500,989, filed on Sep. 29, 2014, now Pat. No. 9,578,605.
(Continued)

(51) Int. Cl.
*H04W 52/14* (2009.01)
*H04W 52/38* (2009.01)
(Continued)

(52) U.S. Cl.
CPC ..... *H04W 52/143* (2013.01); *H04W 52/226* (2013.01); *H04W 52/244* (2013.01);
(Continued)

(58) Field of Classification Search
CPC ..... H04W 52/243; H04W 52/244; H04W 52/245; H04W 52/386; H04W 52/143;
(Continued)

(56) References Cited

U.S. PATENT DOCUMENTS 7,190,958 B1 3/2007 Yarkosky
8,385,266 B1 2/2013 Vargantwar et al.
(Continued)

FOREIGN PATENT DOCUMENTS

WO WO2009/023587 A2 * 8/2008
WO WO2013/046502 * 4/2013 ..... H04B 17/26

OTHER PUBLICATIONS

English Translation of WO2013/046502 from https://patentscope.wipo.int, retrieved Dec. 17, 2020 (Year: 2020).*

*Primary Examiner* — Charles R Craver
(74) *Attorney, Agent, or Firm* — Michael Y. Saji; David W. Rouille

(57) ABSTRACT

Systems and methods are disclosed for adjusting transmit power in a wireless network. In one embodiment, a method is disclosed that includes identifying a selected base station with a first coverage area for adjustment of transmit power; identifying a plurality of neighboring base stations with coverage areas nearby the first coverage area; retrieving a plurality of signal strength measurements from a plurality of mobile devices within the coverage areas of the plurality of neighboring base stations; determining, based on the plurality of measurements, an effect on the plurality of mobile devices within the coverage areas of the plurality of neighboring base stations; and sending an instruction for adjustment of transmit power to the selected base station.

25 Claims, 11 Drawing Sheets

Related U.S. Application Data

(60) Provisional application No. 61/883,610, filed on Sep. 27, 2013.

(51) Int. Cl.
*H04W 52/24* (2009.01)
*H04W 52/28* (2009.01)
*H04W 52/22* (2009.01)
*H04B 17/373* (2015.01)

(52) U.S. Cl.
CPC ..... *H04W 52/245* (2013.01); *H04W 52/247* (2013.01); *H04W 52/283* (2013.01); *H04W 52/386* (2013.01); *H04B 17/373* (2015.01)

(58) Field of Classification Search
CPC .. H04W 52/226; H04W 52/283; H04L 5/0073
See application file for complete search history.

(56) References Cited

U.S. PATENT DOCUMENTS 9,066,274 B2 * 6/2015 Dewagamage ..... H04W 52/244
9,209,857 B2 * 12/2015 Galeev ..... H04W 28/0236
9,226,246 B2 * 12/2015 Hassett ..... H04W 52/325
9,438,393 B2 * 9/2016 Kobayashi ..... H04W 52/143
9,755,798 B2 9/2017 Centonza et al.
9,848,393 B2 * 12/2017 Xu ..... H04W 52/06
2002/0068571 A1 6/2002 Ohlsson et al.
2003/0031135 A1 2/2003 Itoh
2004/0127191 A1 7/2004 Matsunaga
2005/0083999 A1 4/2005 Koo et al.
2007/0042784 A1 * 2/2007 Anderson ..... H04B 17/24 455/450
2007/0173259 A1 7/2007 Akihara
2007/0280175 A1 * 12/2007 Cheng ..... H04B 7/022 370/338
2008/0188258 A1 8/2008 Usuda et al.
2008/0268833 A1 10/2008 Huang et al.
2009/0005105 A1 * 1/2009 Hwang ..... H04W 52/143 455/522
2009/0143070 A1 * 6/2009 Shu ..... H04W 28/18 455/450
2009/0247086 A1 * 10/2009 Lin ..... H04B 17/345 455/67.11
2010/0009705 A1 * 1/2010 Budianu ..... H04L 1/1812 455/501
2010/0029322 A1 2/2010 Englund et al.
2010/0034185 A1 * 2/2010 De Bruin ..... H04L 1/0021 370/342
2010/0041427 A1 2/2010 Hannu et al.
2010/0202322 A1 * 8/2010 Cai ..... H04W 76/068 370/254
2010/0279616 A1 11/2010 Jin et al.
2010/0291936 A1 * 11/2010 Zangi ..... H04B 7/024 455/450
2011/0059741 A1 3/2011 Klein
2011/0194513 A1 8/2011 Kim
2011/0195730 A1 * 8/2011 Chami ..... H04W 52/244 455/501
2011/0222416 A1 * 9/2011 Damnjanovic ..... H04W 72/12 370/252
2011/0244853 A1 * 10/2011 Sheikh ..... H04W 52/08 455/423
2011/0255486 A1 10/2011 Luo et al.
2011/0319084 A1 12/2011 Meshkati et al.
2012/0021753 A1 1/2012 Damnjanovic et al.
2012/0028630 A1 * 2/2012 Yamamoto ..... H04W 52/242 455/422.1
2012/0287813 A1 * 11/2012 Alm ..... H04L 1/0009 370/252
2012/0322497 A1 12/2012 Navda et al.
2013/0005388 A1 * 1/2013 Naka ..... H04W 52/244 455/522
2013/0010633 A1 1/2013 Ringstrom et al.
2013/0017792 A1 1/2013 Miller
2013/0114451 A1 5/2013 Ai-Dhahir et al.
2013/0142138 A1 6/2013 Dinan
2013/0148620 A1 6/2013 Nanri et al.
2013/0182655 A1 7/2013 Das et al.
2013/0260805 A1 10/2013 Park et al.
2013/0303145 A1 11/2013 Harrang et al.
2014/0171081 A1 1/2014 Cozzo et al.
2015/0009839 A1 1/2015 Shikama
2015/0065135 A1 3/2015 Claussen et al.
2015/0131466 A1 5/2015 Razaghi et al.
2015/0195066 A1 7/2015 Singh et al.
2015/0296390 A1 * 10/2015 Mino Diaz ..... H04L 5/003 455/450
2015/0296490 A1 10/2015 Yi et al.
2016/0119071 A1 4/2016 Sagong et al.
2016/0173152 A1 6/2016 Rahman et al.
2016/0286425 A1 9/2016 Gormley et al.
2016/0323787 A1 11/2016 Nanri et al.
2016/0323788 A1 11/2016 Nanri et al.

* cited by examiner

ADJUSTING TRANSMIT POWER ACROSS A NETWORK

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a continuation of, and claims benefit of an earlier filing date under 35 U.S.C. § 120 based on, U.S. Pat. No. 14/500,989, having attorney docket no. PWS-71729US01, filed Sep. 29, 2014, entitled "Adjusting Transmit Power Across a Network," which itself claims the benefit of priority to U.S. Provisional Patent Application No. 61/883,610, filed Sep. 27, 2013, each of which are hereby incorporated by reference in its entirety. In addition, this application incorporates the following applications in their entirety by reference: U.S. patent application Ser. No. 13/889,631, entitled "Heterogeneous Mesh Network and a Multi-RAT Node Used Therein," filed on May 8, 2013, and U.S. patent application Ser. No. 14/211,355, entitled "Methods of Incorporating an Ad Hoc Cellular Network into a Fixed Cellular Network," filed Feb. 18, 2014.

BACKGROUND

In cellular networks, there is a tradeoff between base station transmit power and interference. The greater the transmit power, the better the service and effective range provided to UEs connected to the transmitting base station. However, greater transmit power may cause interference to UEs being serviced by other base stations. When one base station within a network transmits at high power, it can create interference, and thus adversely affect performance for UEs being serviced by nearby base stations.

Typically, decisions to increase transmit power are made on a UE by UE basis without regard to how a decision to increase power will affect neighboring base stations. This typically happens when a UE tells its servicing base station that its signal-to-noise ratio is not good enough for the data rate it needs. In response, the base station typically increases transmit power. Thus, when a base station increases transmit power, it typically does so in response to metrics it receives only from UEs within its coverage area. Its decision making perspective is accordingly limited. In this limited world, each base station may autonomously decide to increase its power, but when there is no consideration as to how this power increase will affect neighboring cells, these power increases can become a free-for-all, which may have a deleterious overall effect on the network. There is, therefore, a need to harmonize power increase and decrease decisions on a wider scale.

SUMMARY

Systems and methods are disclosed for adjusting transmit power in a wireless network. In one embodiment, a method is disclosed that includes identifying a selected base station with a first coverage area for adjustment of transmit power; identifying a plurality of neighboring base stations with coverage areas nearby the first coverage area; retrieving a plurality of signal strength measurements from a plurality of mobile devices within the coverage areas of the plurality of neighboring base stations; determining, based on the plurality of measurements, an effect on the plurality of mobile devices within the coverage areas of the plurality of neighboring base stations; and sending an instruction for adjustment of transmit power to the selected base station.

The method may further comprise performing retrieving the plurality of measurements at a coordination server. The method may further comprise retrieving at least one signal strength measurement from at least one mobile device within the first coverage area. The method may further comprise receiving, at a coordination server, measurement reports from a plurality of mobile devices and storing, at the coordination server, the measurement reports indexed by at least one of time, originating mobile device, and serving base station of the originating mobile device. The method may further comprise retrieving the stored measurement reports. The plurality of signal strength measurements may further comprise at least one of Reference Signal Received Power (RSRP) or Reference Signal Received Quality (RSRQ). The method may also include calculating a first metric corresponding to a number of mobile devices negatively impacted by an increase in power at the selected base station; and calculating a second metric corresponding to a number of devices positively impacted by the increase in power at the selected base station. The method may also include calculating a third metric corresponding to an improvement in signal quality resulting from the increase in power at the selected base station; and calculating a fourth metric corresponding to a reduction in signal quality resulting from a decrease in power at the selected base station. The method may further comprise calculating a decision metric based on the first metric, the second metric, the third metric, and the fourth metric.

In another embodiment, a controller for adjusting transmit power in a wireless network is disclosed that includes a measurement report data store configured to receive measurement reports from mobile devices and to store the measurement reports indexed by a target base station and by a time; and a processor configured to perform steps comprising: identifying a selected base station with a first coverage area for adjustment of transmit power; identifying a plurality of neighboring base stations with coverage areas nearby the first coverage area; retrieving a plurality of signal strength measurements from a plurality of mobile devices within the coverage areas of the plurality of neighboring base stations; determining, based on the plurality of measurements, an effect on the plurality of mobile devices within the coverage areas of the plurality of neighboring base stations; and sending an instruction for adjustment of transmit power to the selected base station. The controller may be coupled to a plurality of base stations at a first interface. The controller may be coupled to an evolved packet core at a second interface. The selected base station may be an eNodeb.

DETAILED DESCRIPTION

Figure 1A:
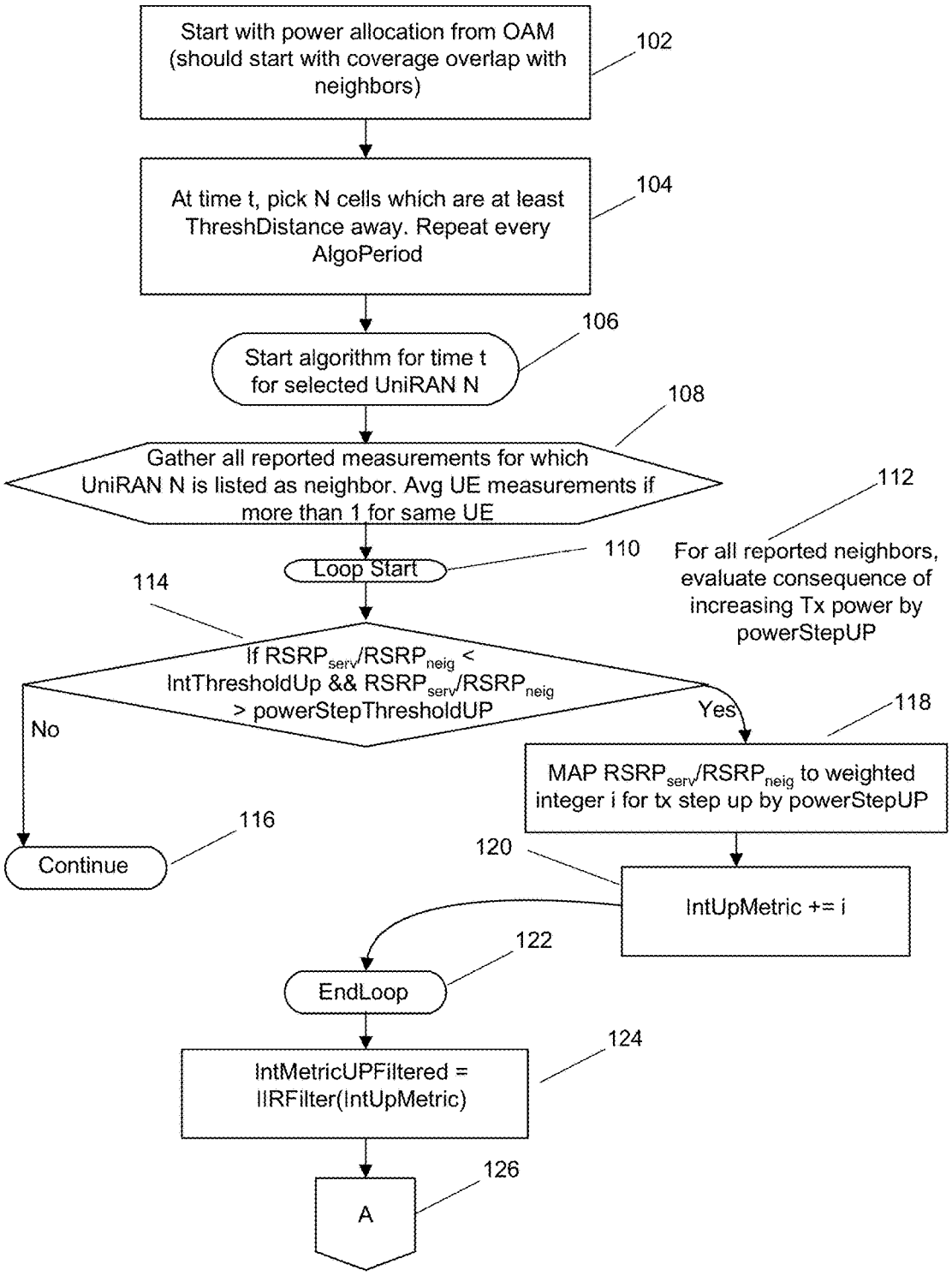
FIGS. 1A-1C are a flowchart depicting a method for making a change in transmit power for a base station, in accordance with some embodiments.

In some embodiments, this invention is a method for controlling base station transmit power. The methods disclosed herein take a holistic approach to making decisions regarding whether, and by how much, to perform an adjustment, i.e., an increase or decrease, of base station transmit power. The approach involves determining an appropriate adjustment for a network of base stations that may interfere with one another, as opposed to determining what would be optimal for a single base station and the UEs to which it is providing service. Stated differently, an adjustment is made that is appropriate for a plurality of base stations that share a single radio resource, such as a frequency band, a time division duplexing (TDD) time slice or other time resource, a spatial resource such as a MIMO resource, or another resource. In other words, a method is provided that enables multi-radio access network (RAN) dynamic radio resource management.

Dynamic radio resource management involves adaptively adjusting radio network parameters based on traffic load, user positions, user mobility, quality of service requirements, base station density, or other factors. Dynamic radio resource management schemes are considered in the design of wireless systems in order to minimize expensive manual cell planning and achieve tighter frequency reuse patterns, resulting in improved system spectral efficiency.

For example, the Long Term Evolution (LTE) specification describes power control, which may be considered a form of dynamic radio resource management. Power control methods are described in 3GPP TS 36.213 Release 11 version 11.8.0, hereby incorporated herein in its entirety. However, the power control methods described in the LTE standard relate only to one or more UEs connected to a single eNodeB that request either more or less transmission power from the single eNodeB. Although interference is considered, it is considered only from the perspective of the single eNodeB.

The present disclosure describes a method for taking into consideration the radio resources of multiple base stations when performing transmission power adjustment. In some embodiments, the method may be performed at a cloud coordination server or other network node located upstream from the base station in a core network.

In some embodiments, a base station may adjust its transmit power based on signals received from another network node. For example, a base station could be configured to send mobile device measurement reports to a coordination module, such as an Operations and Management ("OAM") component, and which may be a software component on a cloud coordination server. The OAM may process the measurement reports, determine whether a power adjustment is needed, and initiate the power adjustment by signaling to the base station. The OAM may receive mobile device measurement reports from at least two base stations, and may use the information from all base stations when calculating the appropriate transmit power. In some embodiments, the OAM may in a base station, or in a computing cloud server, or may be allocated wholly or partially across both nodes. In some embodiments, the OAM may be provided at any network node upstream from one or more base stations. In alternative embodiments, the OAM could reside at any location that controls or manages the wireless network, for example at a mobility management entity (MME) within an evolved packet core (EPC), another core network node, or the like.

A description of the power configuration method follows. In an initial step, a base station has an initial power setting, which may be a default power setting based on a configuration of the base station, a prior operational power setting based on local network conditions, or a power setting based on a prior power adjustment operation as described hereinbelow. The base station may be an eNodeB. One of the criteria considered when determining the initial power setting is the extent of any coverage overlap with neighboring base stations. In some embodiments, a mobile network may be configured to ensure some coverage overlap with neighboring mobile base stations.

Continuing on, in some embodiments, N base stations may be identified, which are each at least a threshold distance away from the selected base station for which the described method performs periodic transmit power optimization routines. The threshold distance is defined as the minimum integer number of network nodes between the selected base station and the measured base station. In other words, the threshold distance is the number of nodes that separate the selected base station and the measured base station. The threshold distance is configurable and is selected to prevent the selection of base stations that are neighbors and that would be impacted, either positively or negatively, by the adjustment of power at the selected base station. The threshold distance may also be selected depending on the characteristics of the network and the number of simultaneous optimization processes desired to be performed.

The number N may be an arbitrary integer number of base stations, greater than zero, up to and including the entire set of base stations that are exactly the threshold distance away. In some embodiments, N may be a configurable value. The value of N is a lower bound for the number of optimization processes that may be performed independently. In some embodiments, up to N optimization processes may be performed simultaneously without disturbing or destabilizing the network. In some embodiments, N is at least 3, such that neighbors of neighbors are not eligible to be selected.

The N nodes may then be processed in parallel, or in a queue, or in any particular order. In some embodiments, for each of the N base stations chosen as described above, a transmit power adjustment algorithm may run in parallel and independently. In other embodiments, the transmit power adjustment may run in sequence. In some embodiments, all of the N base stations may have a transmit power adjustment process performed at a single network coordination server; in other embodiments, there may be more than one coordination server and the processes may be performed independently.

For each mobile device in the wireless network being serviced by the selected base station, measurement reports previously collected from the mobile device are assessed, to measure and report the quality of coverage and transmission power of the selected base station. The mobile device may be a user equipment (UE). Typically, a mobile device is asked to measure signal quality received from its servicing base station as well as signal quality of all base stations within its range. According to some embodiments, these measurement reports may be forwarded and stored at a central server, which may be the computing cloud server comprising the OAM. The measurement reports may be measurement reports as specified in 3GPP TS 25.133, for UMTS networks, or 3GPP TS 36.331, for LTE networks, both documents hereby incorporated herein in their entirety, or other measurement reports. One example of a metric that could be used to measure the quality of coverage is RSRP, which is an LTE specific metric. Another such LTE specific metric could be RSRQ. In alternate embodiments, quality of coverage could be any UE measurement that reflects the quality of coverage, e.g., signal strength, signal-to-noise ratio, and the like.

In some embodiments, UE measurement reports may be collected by a network coordination server, as well as by a connected evolved packet core (EPC) or other core network node. The UE measurement reports may be saved in a database, a text file, a key-value store, or another data store at the coordination server, and the measurement reports may be indexed by base station, by UE, and by time of the report. As UE reports may pertain to more than one base station, measurement reports for both the UE's serving base station and for neighbor base stations may be received and stored. UE measurement reports may be aggregated for a plurality of UEs. UE measurement reports may later be queried to obtain the measurement reports that pertain to a specific base station that is having its power adjusted, in some embodiments. In another embodiment, information pertaining to base stations is extracted from measurement reports as they are received, and indexed to each base station, so that the information pertaining to a base station is readily available when power adjustment is performed. In some embodiments, measurements from only UEs attached from a particular base station are consulted. In other embodiments, measurements from UEs that are not attached to the particular base station are also consulted. In some embodiments, other base stations may also submit measurement reports, and those measurement reports may be handled in the same way as UE measurement reports.

In some embodiments, the measurement report used may indicate the strength of signal and/or error characteristics of the signal of the selected base station. In some embodiments, if a UE reports more than one measurement, an average of all reports for that UE could be used. Alternatively, an average over a particular time window, such as one transport time interval (1 TTI), could be used. Alternatively, the most recent measurement could be used. Alternatively, an average measurement could be derived by averaging the measurement reports at a particular moment in time over several UEs. Alternatively, other methods could be used to synthesize signal strength and error characteristics, using measurement reports or other information available at the OAM.

In some embodiments, the quality of a signal may also be assessed, using a measure known as signal to interference plus noise ratio (SINR). SINR is defined as the power of a signal of interest divided by the sum of the interference power and the power of some background noise, for a particular receiver located at some point in space. Various mathematical models exist to calculate SINR based on the propagation of the incoming signal and interfering signals. In some embodiments, SINR may be calculated based on a reference signal receive power (RSRP), which is the linear average in watts of the downlink reference signal, and also based on a ratio of RSRP to the received signal strength indicator (RSSI), which itself is known as the reference signal receive quality (RSRQ).

For each UE being interfered with by the selected base station, if the selected base station is the strongest interfering base station, the ratio of the signal strength from the UE's servicing base station to the signal strength from the selected base station may be computed. This ratio may be called the signal interference metric, and higher values indicate better service at the UE. It is likely that each UE will receive signals from more than one neighboring base station. For the calculation, the strongest signal received from a neighboring base station, is used to compute our ratio. In LTE networks, UEs measure two parameters on a reference signal: RSRP (Reference Signal Received Power), which is defined as the linear average in watts of the downlink reference signal across a given channel, and RSRQ (Reference Signal Received Quality), which is defined as the ratio of RSRP to the received signal strength indicator (RSSI).

By way of background, RSRP is comparable to the CPICH RSCP measurement in WCDMA. In current LTE systems, this measurement of the signal strength of an LTE cell helps to rank between the different cells as input for handover and cell reselection decisions. The RSRP is the average of the power of all resource elements that carry cell-specific reference signals over the entire bandwidth. It can, therefore, only be measured in the OFDM symbols carrying reference symbols.

The RSRQ measurement provides additional information when RSRP is not sufficient to make a reliable handover or cell reselection decision. RSRQ is the ratio between the RSRP and the Received Signal Strength Indicator (RSSI), and depending on the measurement bandwidth, means the number of resource blocks. RSSI is the total received wideband power including all interference and thermal noise. As RSRQ combines signal strength as well as interference level, this measurement value provides additional help for mobility decisions.

In some embodiments, RSRP is used for calculating the signal interference metric. In some embodiments, RSRQ is used for calculating signal quality. In other embodiments, other parameters, such as RSRQ, RSSI, BER, or C/I, may be used alone or in conjunction with RSRP as a quality measure.

Next, the method calculates four metrics to assess interference from the selected base station given an increase in transmit power. The first metric that may be calculated is the number of UEs being negatively impacted, i.e., that will see a decrease in performance, when the selected base station increases its power. For all reported neighbors of the selected base station, consequences of increasing transmit power by a power increment powerStepUP may be evaluated, where powerStepUP equals the amount by which the power at the selected base station would be increased. In some embodiments, powerStepUP is configurable. In some embodiments, powerStepUP is a step of 2 dBm. A second metric may be calculated for the number of UEs positively impacted, which typically would be some subset of the UEs currently attached to the selected base station. The number of UEs positively and negatively impacted are integer counts. The third metric is a real number, the positive consequence metric, that reflects positive consequences of increasing the signal power to the selected base station on the measuring mobile devices (typically the mobile devices attached to the selected base station). The fourth metric is a real number, the negative consequence metric, that reflects the negative consequences of decreasing the signal power to the selected base station on the measuring mobile devices.

These numbers may be determined by reviewing each measurement report retrieved from a UE and sorting them into UEs that are either positively impacted, negatively impacted, or not impacted at all. When the signal interference metric is greater than a certain maximum threshold for a given UE, the service being experienced by the UE may be sufficient such that there is no need to increase the ratio for that particular UE, and the UE could be marked as not impacted. Similarly, if the signal interference metric is below a certain minimum threshold, link performance may be so degraded that a small improvement in transmit power may not be sufficient to make the link useful for data transmissions to that UE, and the UE could also be marked as not impacted. A range between the minimum and maximum threshold exists wherein increasing the signal interference metric will have some effect on the quality of service experienced by the receiving UEs, and UEs in this range should be marked as either positively or negatively impacted.

The first metric is calculated as follows. A calculation is performed based on the measurement report for the quality measure for the selected base station and the quality measure for the neighboring base station. If the ratio of the quality measure at the serving base station and the quality measure at the neighboring base station is less than the minimum threshold and the ratio of the quality measure at the serving base station and the quality measure at the neighboring base station is also greater than the threshold for increasing the power by the power increment powerStepUP, no need for increasing power is present and the method can terminate. By performing these comparisons, only quality measure ratios in the range between the minimum and maximum threshold are selected for further evaluation, wherein increasing this ratio will have a commensurate effect on the quality of service experienced by the receiving UEs. Quality measure ratios that are in the not impacted category are ignored, or filtered out.

The number of UE measurement reports that have not been filtered out and that would be negatively impacted by increasing the power of the selected base station are thus identified, constituting an integer value. Next, the ratio of the quality measure at the serving base station to the quality measure at the neighboring base station is mapped to a weighted integer. The weight may be based on the number of neighboring base stations or may be based on other factors.

Next, the weighted integer is summed over all neighboring base stations. This value is a measure of the current network performance of the selected base station relative to the UE that it is servicing. This value is the first metric, and is also a measure of the deleterious effects of the interference of a given base station on UEs in the network, and a measure of the number of UEs that would be hurt by increasing power on the selected base station has been calculated. As it may be a measure of the number of UEs, the first metric may be an integer.

Next, the calculation of the second metric is described. The second metric is based on the number of UEs that would be helped by decreasing power at the selected base station. For all UEs and for all neighboring base stations, the consequences of decreasing transmit power by powerStepDOWN are evaluated, where powerStepDOWN is an amount by which the power at the selected base station would be decreased. The result of the steps of this portion of the algorithm is to determine how many UEs being interfered by the selected base station will see an increase in performance if the selected base station decreases its transmit power. In making this determination, the data set containing the ratios computed above may be used when determining the current network conditions. In some embodiments, powerStepDOWN is configurable. In some embodiments, powerStepDOWN is a step of 2 dBm.

Specifically, the ratio of the quality measure at the serving base station and the quality measure at the neighboring base station may be compared to see if it lies within a range as described above, such that the reduction of power will impact the given UE. The UEs that would be positively impacted by a reduction in power are identified and counted. This count is mapped to a weighted integer and the weighted integer is summed over all base stations, to form the second metric that is the number of UEs that will be benefited by increasing power at the selected base station, which may be an integer.

Next, the calculation of the third metric is described. The third metric captures projected consequences of increasing a base station's transmit power on the performance of UEs that are served by it. For all UEs that reported the selected base station as the serving base station, a signal to interference ratio (SINR), which can be determined from the RSRP and the noise level, can be used to determine how much better the performance of a given UE becomes if the selected base station increases its transmit power. For UEs whose signal quality is below a certain threshold, we calculate the third metric using any appropriate function of the signal to interference and noise ratio, computed using RSRQ or RSRP or any other quality measure. Next, the calculated metric may be assigned an appropriate weight and summed with other metrics for other UEs and base stations. This summation is a metric for measuring the benefits of increasing the transmit power of the base station on UEs that are connected to it. This is the third metric, also called the positive consequence metric, and may be a real number.

Next, the calculation of the fourth metric is described. For all UEs that reported the selected base station as the serving base station, a determination may be made of how much worse their performance becomes if the selected base station decreases its transmit power. For such UEs, signal to interference and noise ratio is a good measure of performance. In LTE, RSRQ may be used, or serving and neighboring cell RSRP measurements reported by the UEs may be used. As well, for UEs whose signal quality is below a certain threshold, a real number may be calculated as any appropriate function of the signal to interference and noise ratio, weight that real number appropriately and include in summation, each of these weighted real numbers. This summation is the fourth metric, also described herein as the negative consequence metric, and measures the detriment of decreasing the transmit power of the base station on UEs that are connected to it. The fourth metric may be a real number.

As a result, for each base station, four metrics are generated, two generated using the effect of the base stations interference on neighboring UEs and two generated using signal quality of UEs served by said base station. Each of these four metrics is considered when assessing whether to adjust transmit power up or down. In some embodiments, these four metrics are added and the sum is evaluated.

There are three actions that can be taken after evaluating the sum of the metrics: (1) increase power; (2) decrease power; and (3) make no change to the power at the selected base station. In one embodiment, if the sum of the metrics is positive, a message could be sent to increase the power at the selected base station. If the sum of the metrics is negative, a message could be sent to decrease the power at the selected base station. In an alternate embodiment, a minimum threshold could be set for the sum of the metrics before making any change to power. This embodiment would have the advantage of minimizing network perturbations.

In some embodiments, the threshold for increasing power may be a function of X and of normSINRnei(i), where X is the number of users required to benefit to justify increasing power, and normSINRnei(i) is the normal SINR of each neighbor base station of the selected base station.

In some embodiments, the threshold for decreasing power may be a function of X and of normSINRcand(i), where X is the number of users required to benefit to justify decreasing power, and where normSINRcand(i) is the normal SINR of the selected base station.

In some embodiments, a good SINR may be a value between 13 and 23 dB.

Lastly, after the method is completed, a quiet period may be provided in some embodiments, also to minimize network perturbations. The quiet period may have a value in tens of minutes, or approximately 1-2 hours, in some embodiments. Once the quiet period has elapsed, the method may be run again. The method may be used simultaneously on distance areas of the network, where the distance measure discussed above has a high value, such as four or more, as distant areas of the network may be insulated from the effects of a power adjustment at the just-selected node.

In some embodiments, the power may be adjusted up or down based on the step stored in powerStepDOWN and powerStepUP. As the steps are configurable, a larger or smaller step may be enabled by particular embodiments and installations. In some embodiments, more than one iteration may be performed and a feedback loop may be used to cause power to be stepped up or down to an appropriate level. In some embodiments, the quiet period may be shortened while performing feedback to determine the final power level. In some embodiments, various methods may be used for changing the powerStepDOWN and powerStepUP values, such as linear algorithms, exponential backoff algorithms, or other algorithms. In embodiments where parameters other than radio transmit power are being adjusted, appropriate values for the step may be provided.

Figure 1B:
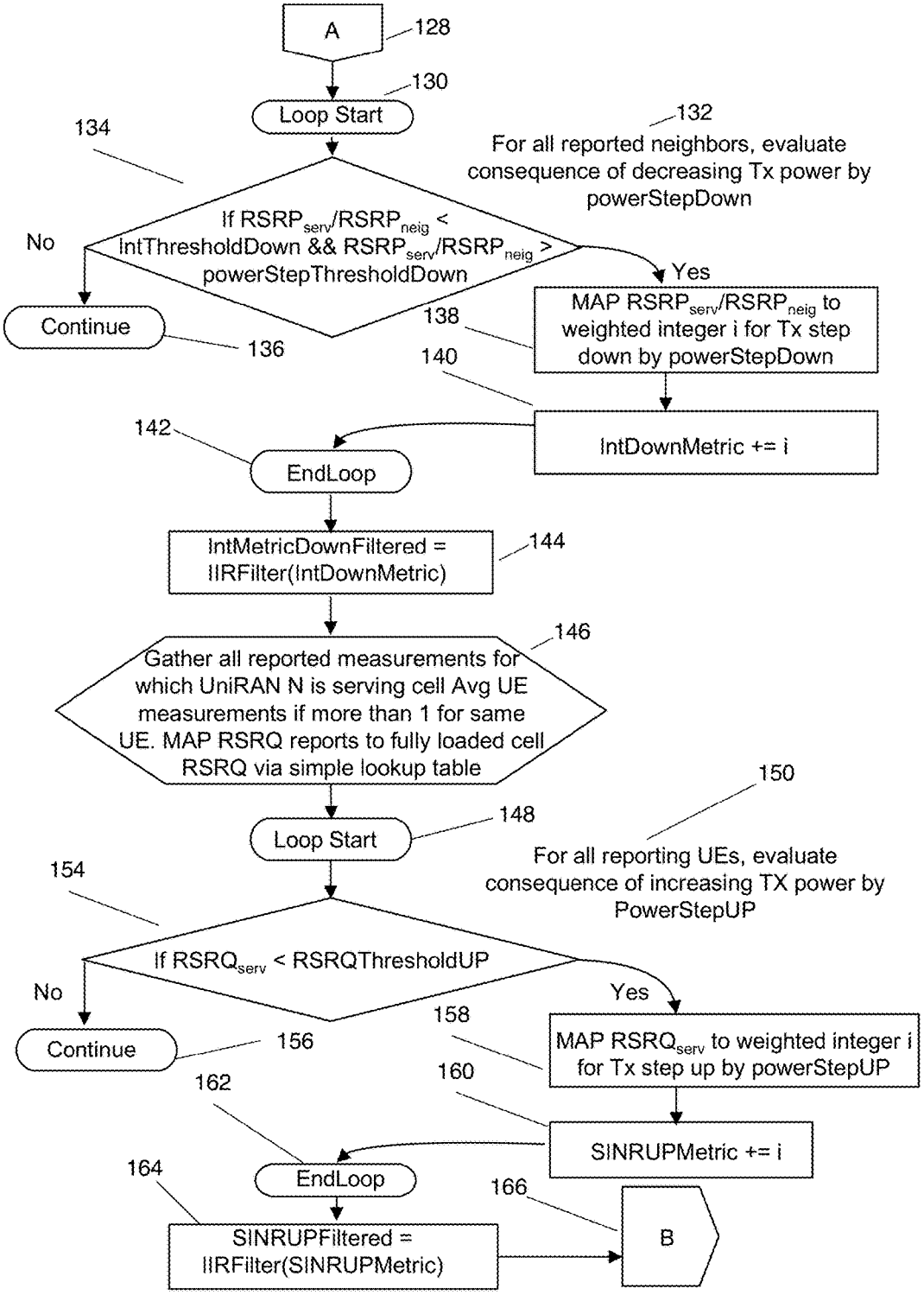
Figure 1C:
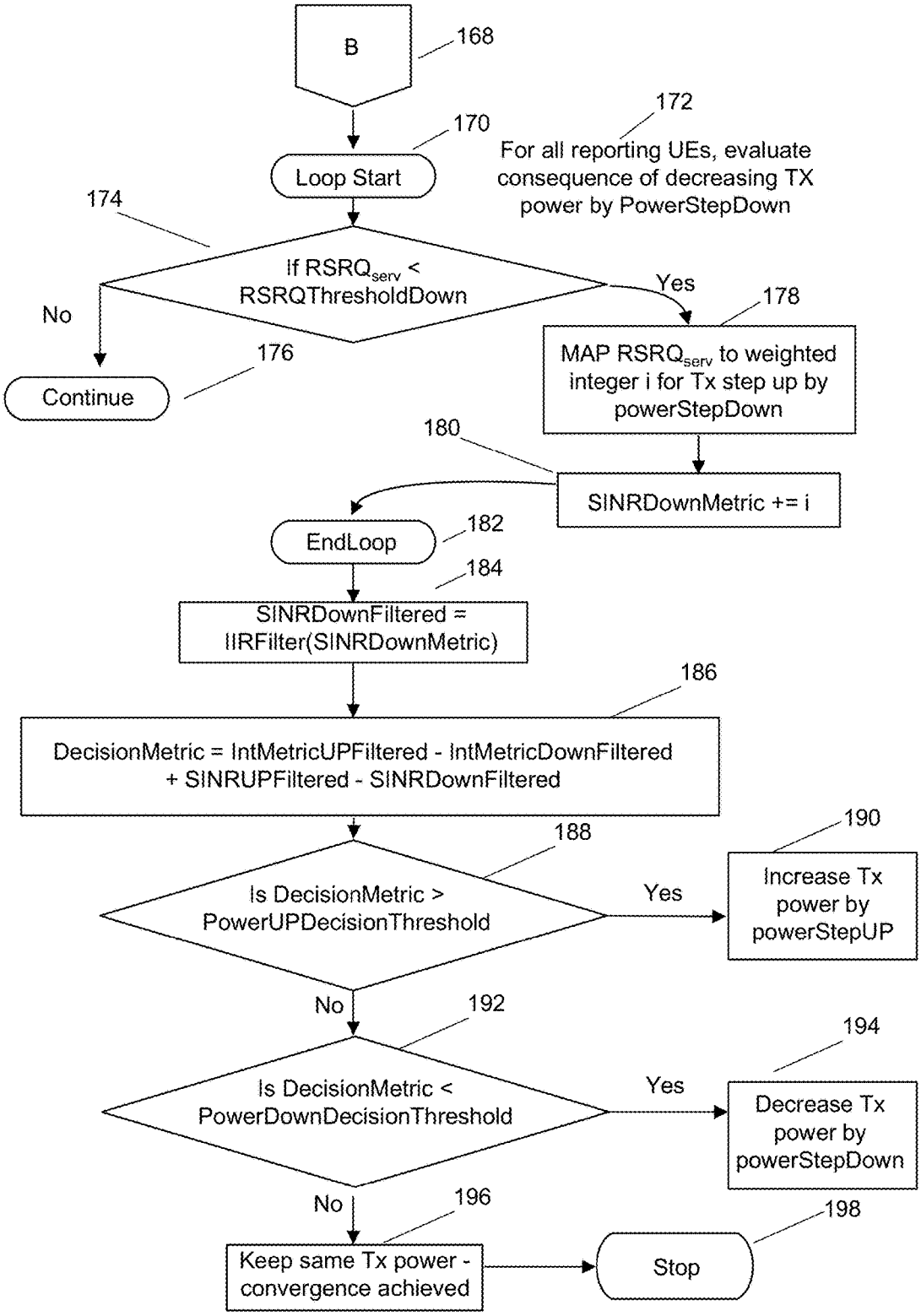

FIG. 1A-1C is a flowchart depicting a method for making a change in transmit power for a base station, in accordance with some embodiments. FIG. 1 shows the steps of the embodiments as they pertain to transmit power optimization for a single base station operating within a larger network. These steps show how a power determination can be made for this single base station while taking into account how the power settings and adjustments for that base station will affect other base stations within the network.

At step 102, a wireless network is in a steady state where a selected base station has a transmit power already allocated for operation. An OAM module may be aware of the previously-allocated transmit power of each of the base stations in the network. The OAM module may also be aware, based on measurement reports from UEs, a priori information, or other information, which base stations are close to each other and/or are overlapping in coverage. The selected base station is identified at step 102, and may be identified based on degree of overlap with other base stations as understood by the OAM, in some embodiments. The OAM as referred to below may be a cloud computing component, a cloud server, a network server in the operator's core network, a network server located between the radio access network and the core network, or another server or computing device, in some embodiments.

At step 104, the passing of time causes a time L to be reached. At time L, the transmit power adjustment operation is initiated. For the selected base station, the OAM identifies which base stations constitute neighbors by consulting the preconfigured value of ThreshDistance, identifying each base station within a distance of ThreshDistance from the selected base station, and placing them into a queue. Note that the passing of time subsequent to time L will continue to trigger the subsequent activation of the transmit power adjustment according to a period AlgoPeriod.

At step 106, the power adjustment algorithm is started with reference to time t for the selected base station, which is here referred to as a "UniRAN." Time t is a time for which UE measurement reports are available for each of the appropriate base stations, or for at least for the selected base station, in some embodiments, and does not necessarily correspond to time L. The determination of time t leads to step 108, where all UE measurement reports are retrieved that were made at time t (or during a window around time t) by UEs attached to the selected base station. If more than one measurement is available for a single UE, the average of all this mess for that UE is used. In some embodiments, measurement reports are available on the OAM. In some embodiments, measurement reports are retrieved from base stations for other network nodes. Measurement reports are retrieved for the selected base station, and also for a stations that are identified as neighbors in the measurement report.

At step 110, the power adjusted operation is begun as a loop over all reported measurements for each base station in the set of neighbor base stations. The loop includes steps 114-120. Note 112 indicates that the loop serves to evaluate the consequence at each of the reported neighbors of increasing the transmit power of the selected base station by the configured power step increment powerStepUP.

At step 114, a ratio $RSRP_{serv}/RSRP_{neigh}$, the relative ratio of the reference signal received power at the selected node versus at each neighbor node, is compared with a first threshold IntThresholdUP. If the comparison does not show that $RSRP_{serv}/RSRP_{neigh}$ is less than the threshold, no need for continued processing on this neighbor base station is required, and processing of the loop continues (step 116) with the next loop iteration/base station. Additionally, $RSRP_{serv}/RSRP_{neigh}$ compared with powerStepThresholdUP. If $RSRP_{serv}/RSRP_{neigh}$ no exceed powerStepThresholdUP, no need for continued processing is required and processing continues with the next iteration (step 116).

At step 118, if it is determined that the neighbor base station passes these two tests, the ratio $RSRP_{serv}/RSRP_{neigh}$ is used to determine the value of an integer i by multiplying $RSRP_{serv}/RSRP_{neigh}$ with a weight. In some embodiments, the multiplied value may be rounded to produce an integer. In some embodiments, the weight may be a floating-point value, a real number, or another value. At step 120, the value i is added to an integer counter, IntUpMetric, which retains its value across multiple iterations of the loop 110. At step 122, the loop ends.

At step 124, an additional filtering step is performed on IntUpMetric, producing the value IntMetricUPFiltered, which is an integer value reflecting the number of UEs that would be negatively impacted by increasing power at the selected base station. The filter is an infinite impulse response (IIR) filter, here labeled IIRFilter. An IIR filter is a smoothing filter known in the art that is used to smooth out short term variations and retain long term statistics. In some embodiments, the IIR filter may be omitted. In some embodiments, more or less sensitive IIR filtering parameters may be used. As an example of a scenario in which the IIR filter may be useful, a busload of tourists may introduce a temporary spike in the level of interference within a given base station's coverage area. If the bus transits over a short time, the measurement reports during that time should be discounted and smoothed out, so that power adjustments are not biased by the transit of the tour bus through the base station's coverage area.

Step 126 ("A") corresponds to step 128 at FIG. 1B.

Turning to FIG. 1B, step 128 ("A") corresponds to step 126 at FIG. 1A.

At step 130, processing continues with a second loop that iterates over all reported neighboring base stations, as reported by UEs in their measurement reports. Note 132 states that the iteration is to evaluate the consequences of decreasing transmit power at the selected base station by powerStepDown. Loop 130 includes instructions 134-140, and ends at step 142.

Step 134, within the loop, is a comparison similar to the comparison at step 114, only that different thresholds IntThresholdDown and powerStepThresholdDown are used to assess the range of UE measurement reports that are helpful when evaluating the second metric, i.e., the number of UEs that would be positively impacted by the reduction of transmit power at the selected node. At step 136, ratios of $RSRP_{serv}/RSRP_{neigh}$ that do not satisfy the conditions in step 134 are ignored and execution continues on the next loop iteration. At step 138, if a given $RSRP_{serv}/RSRP_{neigh}$ ratio does satisfy the conditions in step 134, it is multiplied by a weighting factor to form a weighted integer i. At step 140, weighted integer i is added to a parameter, IntDownMetric, which persists across iterations of the loop.

Once the loop ends at step 142, IntDownMetric is filtered according to an infinite impulse response filter to derive the second metric.

At step 146, all reported UE measurement reports are gathered for each base station of the set of base stations N. RSRQ may be used to assess signal quality. In some embodiments, the RSRQ value from the UE measurement report may be used unchanged. This value is $RSRQ_{serv}$. The reporting range of RSRQ values is between −19.5 dB and −3 dB. In some cases, more than one UE measurement may be available, in which case measurements may be averaged, in some embodiments. This is because RSRQ measurements are heavily dependent on instantaneous traffic load, and thus should be averaged over a longer period when possible.

While SINR is a measure of a physical quantity, RSRQ is a relative measure. As such, in some embodiments, a lookup table of RSRQ values may be used to correct or bias the original RSRQ values, such as when the UE report is for an RSRQ value that does not reflect the fact that the base station in question is currently fully loaded. In some embodiments, the lookup table may reflect a function that adds or subtracts from the measured RSRQ based on loading at the selected base station. In some embodiments, a load measure may be used that is a ratio between the number of frequency resources in//use to the number of frequency resources available to the base station. In some embodiments, another means, such as an algorithmic function, may be used to normalize RSRQ based on loading of the selected base station.

At step 148, a loop is started for calculating the third metric, being for evaluating the consequences of increasing transmit power by the increment powerStepUP for each UE, as described in note 150. The loop includes steps 152-162.

At step 154, the comparison is made between the $RSRQ_{serv}$ or a particular UE and a RSRQ threshold. If the value of $RSRQ_{serv}$ is above the threshold, there is no need to increase transmit power for this UE, and the loop continues to the next UE. If the value of $RSRQ_{serv}$ is not above the threshold, the signal is low and would benefit from increasing the transmit power. Execution continues to step 158, where the $RSRQ_{serv}$ of this UE is mapped to a weighted integer. At step 160, the integer is added to an integer value SINRUPMetric, which persists across loop iterations, and the next iteration of the loop is begun. SINRUPMetric corresponds to a count of UEs that would benefit from the increase in transmission power at the selected base station.

At step 162, the loop terminates. At step 164, the SINRUPMetric value is subject to IIR filtering, producing value SINRUPFiltered, which is the third metric.

Step 166 corresponds to step 168 at FIG. 1C.

Turning to FIG. 1C, step 168 corresponds to step 166 at FIG. 1B. Step 170 begins a loop for calculating the fourth metric. The loop runs over all reporting UEs, and determines the consequences of decreasing the transmit power by PowerStepDown, as indicated at note 172. Loop 170 includes steps 174-182. Although it is not described in step 170 or step 174, in some embodiments, UE RSRV measurements may be filtered, averaged, mapped using a lookup table, or otherwise adjusted prior to comparison with the thresholds described in step 174.

At step 174, the $RSRQ_{serv}$ from the UE is compared with a threshold, RSRQThresholdDown, to determine whether the UE will be impacted by reducing the transmit power level of the selected base station by the amount powerStepDown. If $RSRQ_{serv}$ is less than RSRQThresholdDown, there is no need to use this UE in assessing the transmit power level, and this UE is ignored, as indicated at step 176. If $RSRQ_{serv}$ is not less than RSRQThresholdDown, processing continues for this UE.

At step 178, the $RSRQ_{serv}$ is mapped to a weighted integer i, and at step 180, integer i is added to SINRDownMetric, which persists through the loop. After all UE measurement reports are processed, the loop ends at step 182. At step 184, SINRDownMetric is filtered using an infinite response filter.

At step 186, all four metrics have been calculated, and a final decision metric is calculated. One decision metric is used for making both the power up and power down decisions. The formula used, in some embodiments, is:

DecisionMetric=IntMetricUpFiltered−IntMetricDownFiltered+SINRUpFiltered−SINRDownFiltered In some embodiments, the decision metric may be based on one, two, or three of the four metrics. In some embodiments, additional metrics may be provided. In some embodiments, weighting factors may be applied to the metrics to further adjust the operation of the system. In some embodiments, the positive/negative signs of the four metrics may all be positive and the metrics may be added. In some embodiments, the signs may be mixed, and the metrics may be added (resulting in some metrics being subtracted, as shown above).

At step 188, if the decision metric is greater than the decision threshold for increasing power, execution passes to step 190, where transmit power is directed to be increased at the selected base station by powerStepUP. Otherwise, execution passes to step 192. At step 192, if instead the decision metric is below the decision threshold for decreasing power, execution is passed to step 194, where transmit power is directed to be decreased at the selected base station by powerStepDown. Otherwise, execution continues at step 196.

At step 196, it is determined that no transmit power adjustment is needed, and at step 198, execution ends. A quiet period follows until execution is re-triggered based on a timer, in some embodiments. Incoming UE measurement reports are saved and associated by UE, by base station, and by time for later retrieval, so that the reports will be available during the next execution of this method.

Figure 2:
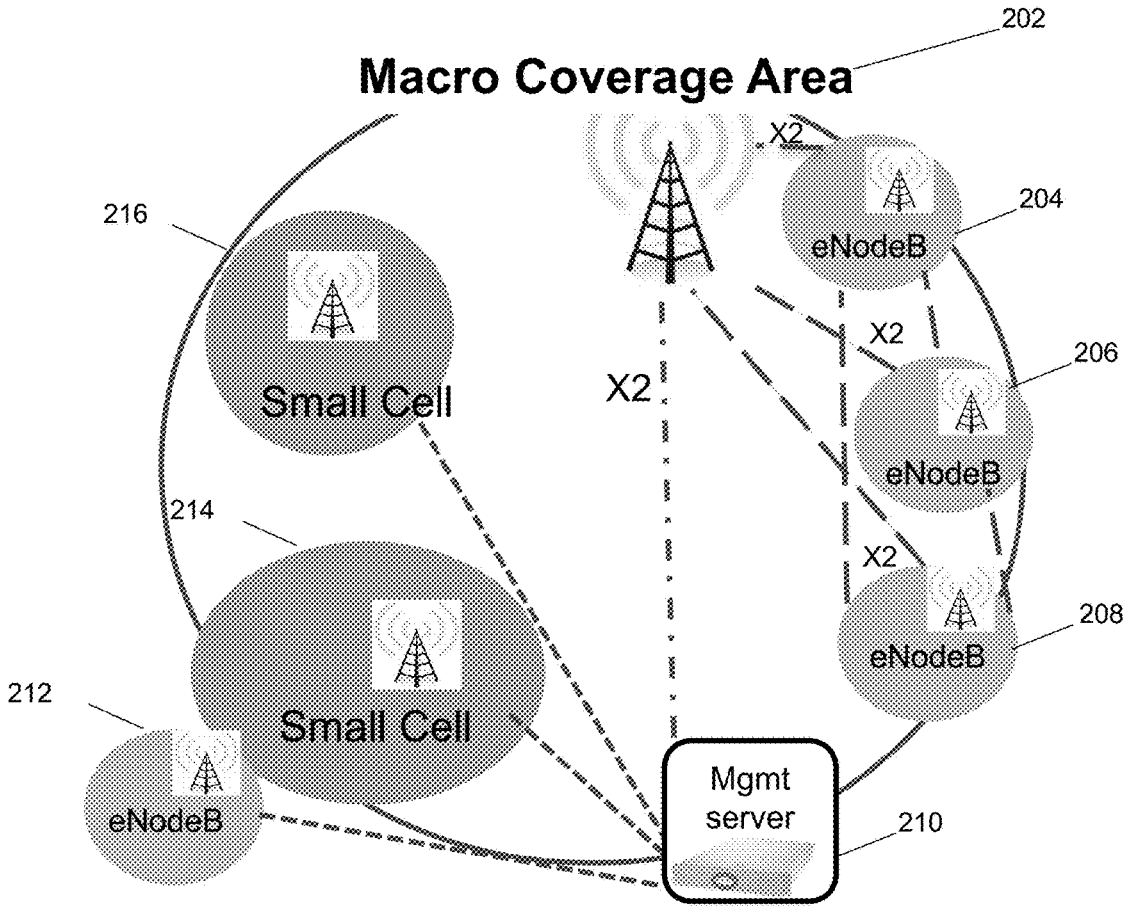
FIG. 2 is a schematic diagram showing an exemplary wireless network in accordance with some embodiments.

FIG. 2 is a schematic diagram showing an exemplary wireless network in accordance with some embodiments. Seven wireless networks 202, 204, 206, 208, 216, 214, and 212 are presented, each with a different coverage area shown by overlapping ovals. Each of the wireless networks is managed by management server 210, and connected thereto by X2 protocol links. In some embodiments, some base stations may be eNodeBs. In some embodiments, some base stations may be small cells, macro cells, or micro cells. In some embodiments, the base stations may be multi-radio access technology (multi-RAT) base stations supporting EUTRAN, UTRAN, and other radio access technologies (e.g., 3G, 4G LTE, and Wi-Fi technologies). Management server 210 is connected to each of the cells, and receives and stores UE management reports from UEs attached to each cell. Network 204 does not have an overlapping coverage area with any network except for network 202. Network 202 is at a distance 1 away from network 204. Through network 202, network 204 is connected to the other networks. Management server 210 is aware of each of the cells. Network 212 is not coextensive with network 202, but is connected via network 214.

In an exemplary case, at time $t_2$, management server 210 initiates transmission power adjustment assessment for network 204 at a prior time $t_1$. The threshold distance ThreshDistance is configured to be 2. In this case, network 202, with distance 1, and networks 206, 208, 216, and 214, with distance 2, are determined to be neighbors. However, network 212 is at a distance 3 away from network 204, and will not be assessed as a neighbor. Thus, regardless of the signal levels measured by UEs at time $t_1$, since the ThreshDistance is configured to be 2, the effect of changing the power of network 204 on network 212 will not be incorporated into the determination. Clearly, other ThreshDistance parameters could be used in this case. As well, network 212 could be processed in parallel with network 204 in this case.

Figure 3:
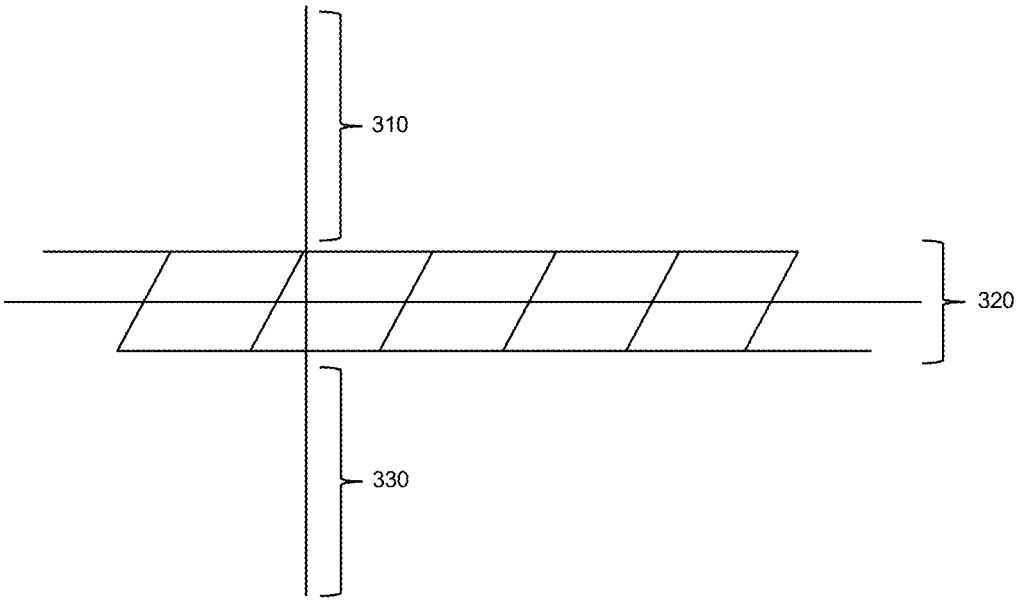
FIG. 3 is a schematic diagram illustrating numerical ranges used to determine whether to make a change to transmit power, in accordance with some embodiments.

FIG. 3 is a schematic diagram illustrating numerical ranges used to determine whether to make a change to transmit power, in accordance with some embodiments. If the sum of the four metrics is positive and therefore in the range 310, the selected base station's transmit power may be increased. If the sum of the four metrics is negative and in the range 330, the selected base station's transmit power may be decreased. If the sum of the metrics falls within a predetermined middle threshold 320, no change may be needed.

In some alternative embodiments, another method is provided for performing adjustment of transmit power at a network node. In this alternate embodiment, first, a particular base station, serving a set of UEs, is selected. For the particular base station, an existing signal to interference ratio (SINR) metric is calculated and then compared with a target SINR. If the existing SINR is greater than, or greater than or equal to, the target SINR, in some embodiments, a determination is made to adjust the transmit power of the selected base station. In some embodiments, the existing SINR may be computed per UE to obtain an individual SINR per UE, based on measurement reports, and then the individual SINR values per UE may be combined, either by averaging, summing, weighted summing, or another technique, in order to create a single existing SINR metric for comparison with the target SINR.

Next, a possible increment value is computed. The increment value may be retrieved from a configuration file, or may be determined based on the appropriate value to cause the SINR of the particular base station's network to approach the target SINR, or may be dynamically assigned based on previously-used transmit power increment values, or may be based on a lookup table, or may be based on other factors, in some embodiments.

Next, a candidate SINR metric is calculated, to simulate the effect on attached UEs of an increase of transmission power according to the possible increment value. The candidate SINR metric may be comparable to the existing SINR metric, in some embodiments, such that the difference between the two metrics reflects the increase in performance that will result when transmit power is increased.

Next, a neighbor SINR metric is calculated, to simulate the effect of an increase of transmission power on UEs attached to a neighboring base station. As the increase of transmission power of the particular base station is purely interference to UEs attached to the neighboring base station, it may be possible to calculate SINR by increasing the I component of the SINR calculation.

In some embodiments, the neighbor SINR metric is subtracted from the candidate SINR metric, and the result is compared with a decision threshold. If the resultant value is greater than the decision threshold, power modification may proceed. In some embodiments, if the resultant value is greater than the decision threshold and a max neighboring SINR gain is greater than a second decision threshold, power modification may proceed.

Figure 4A:
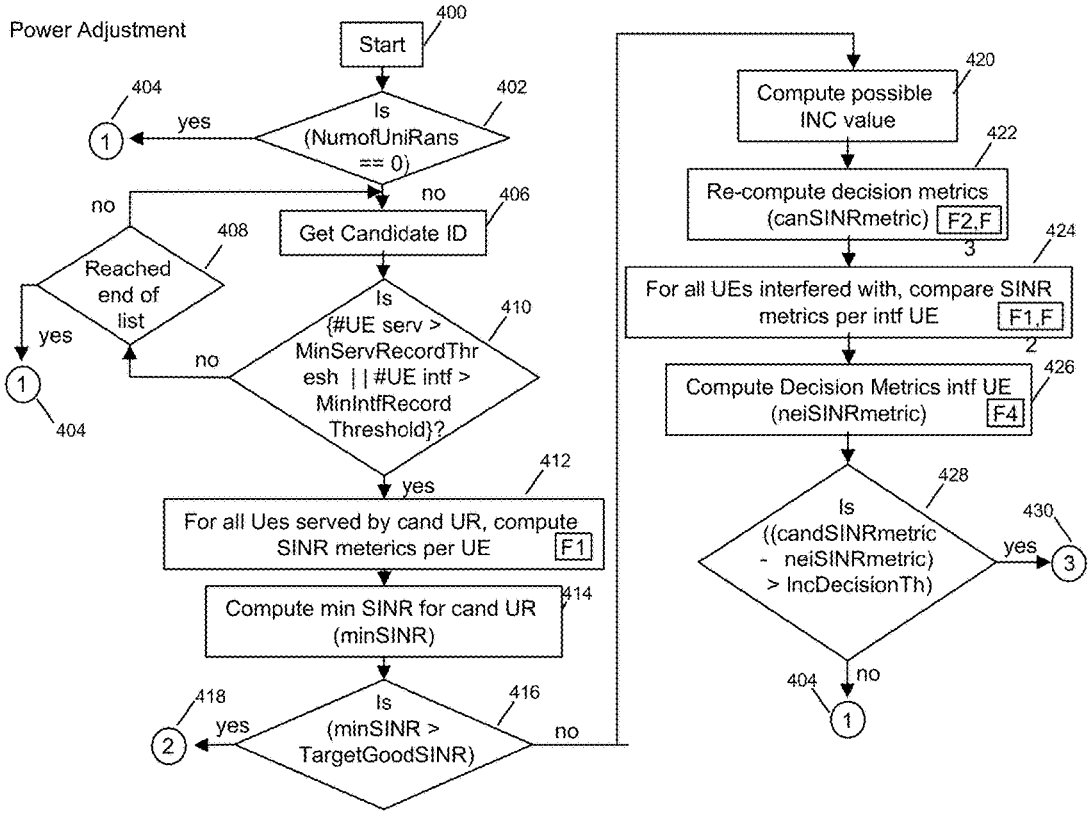
FIGS. 4A-4B are an alternative flowchart depicting a method for making a change in transmit power for a base station, in accordance with some embodiments.
Figure 4B:
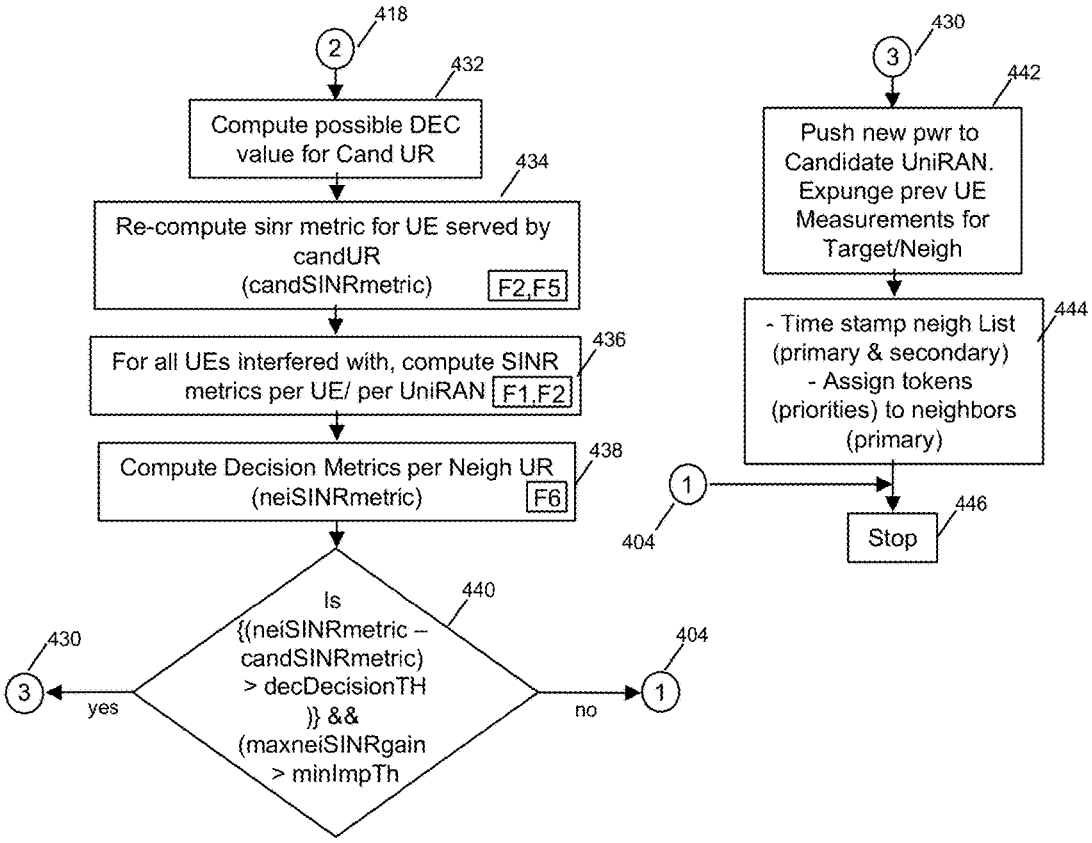

FIGS. 4A-4B together constitute an alternative flowchart depicting a method for making a change in transmit power for a base station, in accordance with some embodiments. Unless otherwise specified, the operations described in FIGS. 4A-4B may occur on a network server, cloud server, core network server, aggregation server, or other server coupled to one or more base stations.

In FIG. 4A, at step 400, a power adjustment method is initiated. At step 402, a number of base stations is selected and put into a adjustment queue. In some embodiments, a single base station may be selected. In some embodiments, a plurality of base stations may be processed simultaneously, based on a distance measure used to partition the network. The base stations, here referred to as "UniRANs," may be selected by a user or by an automatic process that identifies which base station needs a power adjustment based on a timer, a base-station-specific adjustment request, a network-wide power optimization request, or another request. If no base stations are selected for power adjustment, operation passes to step 404. Otherwise, operation passes to step 406.

At step 404, operation terminates. Step 404 is referenced at various places throughout the remainder of FIGS. 4A-4B.

At step 406, a candidate base station (or UniRAN) is selected. In some embodiments, base stations are identified by an ID, which is obtained at this step from the adjustment queue. At step 410, characteristics of the selected base station are obtained and evaluated. Specifically, if the number of UEs served by the selected base station exceeds a minimum serving record threshold, or if the number of UEs being interfered with exceeds a minimum interference record threshold, operation continues to step 412. Otherwise, either the end of the list is detected at step 408, leading to termination at step 404, or a new candidate base station is selected at step 406 and the characteristics of the new base station are evaluated at step 410 again.

At step 412, it has been determined that the candidate base station will have its power adjusted. For all UEs served by the candidate base station, a computation is performed to obtain SINR metrics per UE at the candidate base station. For all UEs that reported the candidate base station as the serving base station, a signal to interference ratio (SINR), which can be determined from the RSRP and the noise level, can be used to determine how much better the performance of a given UE becomes if the selected base station increases its transmit power. One or more SINR metrics, as described elsewhere herein, may be calculated or obtained. As an exemplary metric, a single number reflecting an SINR may be obtained for each UE.

In some embodiments, at step 412, the following formula may be used to calculate the SINR metric:

$$\text{curSINRUErb} = 10 * \log10\{10\text{^serv_rsrp}/10) \Big/ \left(7.2e-106 + \sum_{i=0}^{N} \text{getNEILoad(i)} * 10\text{^(neigh_rsrp}/10)\right)\Bigg\};$$

getNEILoad(i) –> 1/6 (Low)
–> 1 (Heavy)
–> 0.5 (Moderate)

where n is the number of neighbors.

At step 414, in some embodiments, a minimum SINR over all UEs served by the candidate base station (i.e., the lowest SINR of all SINRs obtained from the UEs served by the candidate base station) may be calculated, based on the results of step 412.

At step 416, the minimum SINR obtained in step 414 may be compared to a target good SINR value, which may be an a priori value or a value obtained via configuration. If the minimum SINR of all of the UEs served by the candidate base station is above the target good SINR, then the transmit power at the candidate base station does not need to be increased, but operation continues at step 418. If the minimum SINR of all of the UEs served by the candidate base station is not above the target good SINR, then the transmit power at the candidate base station would benefit from being increased, and operation continues at step 420.

At step 420, an amount of increased power is determined. In some embodiments, this may be a predetermined increment of power that is configured. In other embodiments, a lookup table may be used to map a certain power level or a certain number of UEs to an appropriate increase value. In other embodiments, the increase value may be obtained from a cloud coordination server, from a self-organizing network module, from a network node that is being interfered with, or from another node.

Operation continues at step 422. In step 422, further decision metrics are calculated. Specifically, a candidate SINR metric, candSINRmetric, is calculated, taking into account the power increase value computed at step 420 for all UEs attached to the candidate base station. In some embodiments, the following formula may be used:

$$\text{curSINRUErb} = 10 * \log10\Bigg\{10\text{^serv_rsrp+offset(if serv)}/10 \Big/ \left(7.2e-016 + \sum_{i=0}^{N} \text{getNEILoad(i)} * 10\text{^(neigh_rsrp+offset(if nei)}/10)\right)\Bigg\};$$

where N : number of neighbors getNEILoad(i) –> 1/6 (Low)
–> 1 (Heavy)
–> 0.5 (Moderate)

For all (k) UE < targetGoodSINR normSINRi = ((newSINRi – oldSINRi)/oldSINRi);

$$\text{candSINRmetric} = \sum_{i=0}^{k} \text{normSINRi};$$

At step 424, the UEs not attached to the candidate base station but instead attached to the neighbor base stations, the same UEs are subject to increased interference by a power increase at the candidate base station. A SINR metric may be calculated for each of these interfered-with UEs corresponding with the SINR of the neighboring base station to which the affected UE is attached.

At step 426, the metrics for each of these UEs calculated in step 424 may be combined to form a single metric, by averaging or by another method. This metric may be known as neiSINRmetric. In some embodiments, the following formula may be used:

For all (m) UEs interfered with [per neighbor]

normSINRi=((oldSINRi31 newSINRi)/oldSINRi);

$\text{neiSINRmetric}=\Sigma_{i=0}^{m}\ \text{normSINRi};$

At step 428, the change in the SINR metrics, represented here as the difference of the candidate SINR metric and the neighbor SINR metric, is compared with the increment decision threshold. If the change in SINR metrics is greater than the threshold, the increase in power would be a positive change, so execution passes to step 430 to initiate the change. Otherwise, execution passes to step 404.

Turning to FIG. 4B, step 418 is the entry point described above, which is executed when signal strength is sufficiently strong that no increase in transmission power is needed. However, it is possible that a decrease in signal power would result in a reduction of interference, in which case a decrease in signal power would be warranted even when an increase would not. Operation passes to step 432.

At step 432, a potential decision threshold value may be calculated for the candidate base station, as described elsewhere herein.

At step 434, a candidate base station SINR metric (candSINRmetric) may be calculated for UEs served by the candidate base station, based on a hypothetical decrease in transmission power. At this step, measurement reports from every UE served by the candidate base station may be retrieved, and SINRs retrieved or calculated for each of those measurement reports. In some embodiments, the SINR measurements/calculations may be with respect to the candidate base station, and at a specific time. The metrics may be merged into a single metric via averaging, summing, or another method, as described elsewhere herein. In some embodiments, the following formula may be used:

For all (k) UE<targetGoodSINR normSINRi=(oldSINRi–newSINRi)/oldSINRi);

$\text{candSINRmetric}=\Sigma_{i=0}^{k}\ \text{normSINRi};$

At step 436, an interfered-with UE SINR metric may be calculated for UEs that are not served by the candidate base station but instead are subject to interference from the candidate base station, based on a hypothetical decrease in transmission power. The interfered-with UE SINR metric may be a count, in some embodiments. The interfered-with UE SINR metric may be aggregated across all UEs and thereby averaged, summed, or otherwise combined.

At step 438, the decision metrics for each base station that is a neighbor of the candidate base station (neighSINRmetric) may be calculated, based on a hypothetical decrease in transmission power. In some embodiments, the following formula may be used:

For all (m) UEs interfered with [per neighbor]

normSINRi=((newSINRi−oldSINRi)/oldSINRi);

neiSINRmetric=$\Sigma_{i=0}^{m}$ normSINRi;

At step 440, the decision metrics are evaluated as follows. If the difference between the two SINR metrics, neiSINRmetric and candSINRmetric, is greater than the decrease decision threshold decDecisionTh, and another parameter, the maximum neighbor SINR gain, is greater than the minimum threshold for performing an adjustment, then operation passes to step 430. Otherwise, operation passes to step 404, which leads immediately to termination. Note that the difference between the two SINR metrics may be thought of as the number of UEs positively affected minus the number of UEs negatively affected, in this case, because the change under consideration is a decrease, not an increase, in transmit power.

Turning to step 430, this step is reached only after it is concluded that transmission power will be changed. At step 442, the power changes are committed to the network, by sending a signal to the candidate base station to change the power to a particular power level. At this step, previous UE measurements are also cleared from the system. This is because once the power levels have changed, new UE measurements reflecting the new state of the system are required.

At step 444, administrative tasks are performed to ensure that the power optimization method is performed again on the proper nodes. A time stamp neighbor list is kept up to date, and tokens, which represent priorities, are assigned to neighbors of the base station that was just adjusted. This ensures that the system is checked after the transmission power has changed and the network has settled back into a steady state.

Operation concludes at step 446.

Figure 5:
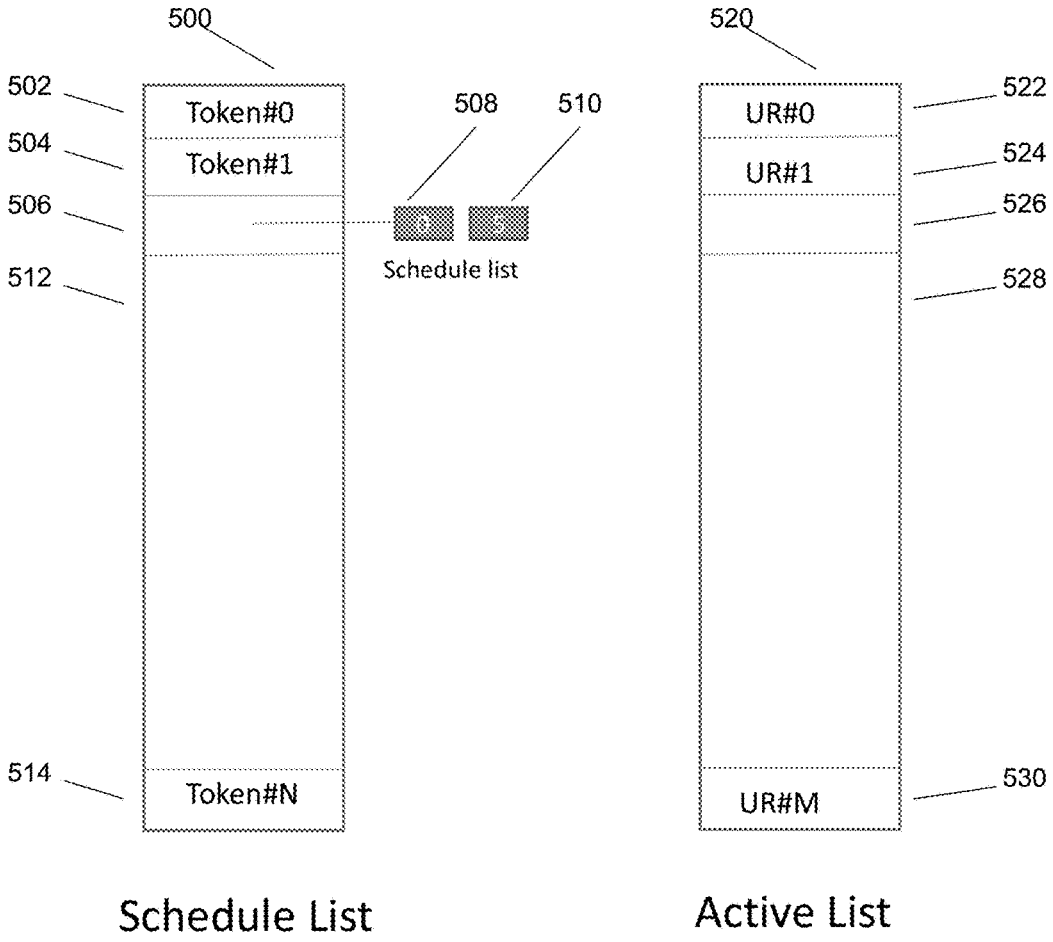
FIG. 5 is a flowchart depicting a method for selecting a candidate radio access network for performing a power adjustment method, in accordance with some embodiments.

FIG. 5 is a flowchart depicting a method for selecting a candidate radio access network for performing a power adjustment method, in accordance with some embodiments. An active list 520 includes a list of base stations (here abbreviated UR) 522, 524, 526, 528, and 530, reflecting all base stations that are currently in an active state and in communication with a coordination server, in some embodiments. As base stations become active, the coordination server adds additional base stations to the active list. The active list may be maintained independently of any power control method, in some embodiments.

Also shown is schedule list 500, which includes tokens that represent base stations in the active list 520. Schedule list 500 includes tokens 502, 504, 506, 512, and 514, and in some embodiments may contain a fixed number, an unlimited number, or an adjustable number of tokens. Schedule list 500 represents a queue for initiating processing of transmit power adjustments. When a transmit power adjustment scheduling process is activated, which may occur in some embodiments at regular intervals, the schedule list 500 may be used as a first-in, first-out queue for selecting a candidate base station for power adjustment evaluation. In the depicted schedule list, token #0 502, representing base station UR#0 522, is next to be updated.

Schedule list 500 may also include sub-tokens 508 and 510, in some embodiments. When a power adjustment evaluation process is performed, it may result in a power adjustment for the candidate base station, but it may also result in several neighbor base stations being added to the queue for evaluating the effects of the adjustment to the candidate base station. Sub-tokens 508 and 510 represent one embodiment of an enhancement to schedule list 500 that allows the schedule list to have nested lists for accommodating neighbor base stations. FIG. 5 depicts token #0 502, which will be the next-scheduled base station; token #1 504, which will follow after token #0 502; and schedule list 506, which will follow after token #1 504. When schedule list 506 is evaluated by the power adjustment process, tokens 508 and 510, which also represent base stations, will be evaluated in turn. In some embodiments, instead of using a nested schedule list, neighbor base stations may be added sequentially to a single-level queue, either following the location of the currently-selected base station or at the end of the queue.

In operation, candidates may be selected for power adjustment at scheduled intervals. In some embodiments, the schedule interval may be selected to be between 30 minutes and 120 minutes. A list may be stored of when each base station has had its power adjusted, which may include time stamps.

In some embodiments, after a particular base station has its power adjusted, its neighbors may be evaluated for readjustment also. In some embodiments, each neighbor may be evaluated for priority, and based on the priority, a timer may be set for a number of minutes such that the timer will cause the power of the neighbor to be adjusted once the number of minutes has elapsed.

The priority function may be the number of interfering UEs, #UEintf, divided by the total number of UEs attached at the neighboring base station, TotalUEnei. This priority function may be evaluated and compared against one or more thresholds. If the priority function exceeds a first threshold, the timer may be set with a value of 30 minutes. If the priority function exceeds a second threshold, the timer may be set with a value of 60 minutes, and so on.

In some embodiments, a recurring timer may be set for continually updating the power of one or more base stations by updating the power of a base station in queue. Once the recurring timer is triggered, the queue may be evaluated in standard queue order (last in, first out), FIFO order (first in, first out), or another order. The queue may be evaluated in order of last update, such that the base station not updated the longest is processed first. Alternatively, a threshold may be used, such as 30 minutes, so that a random base station is processed as long as it has not been updated in a shorter time than the threshold.

Figure 6:
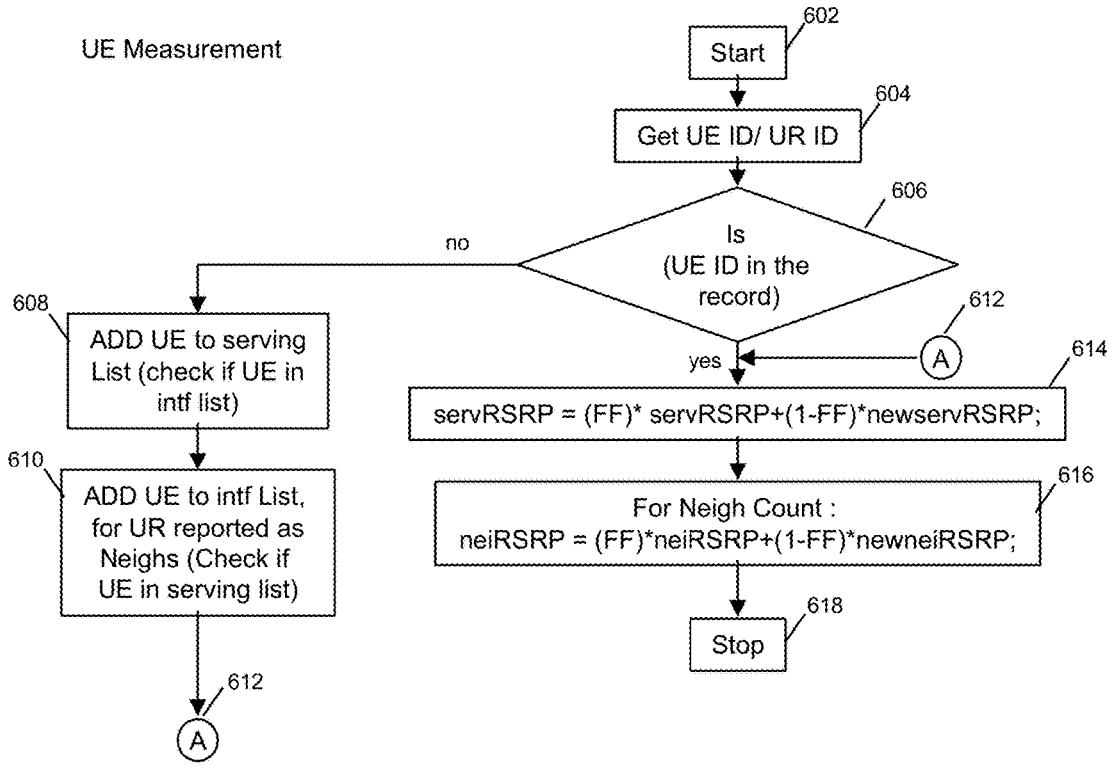
FIG. 6 is a flowchart depicting a method for receiving and interpreting measurement reports from a mobile device, in accordance with some embodiments.

FIG. 6 is a flowchart depicting a method for receiving and interpreting measurement reports from a mobile device, in accordance with some embodiments. Measurement reports may be received and stored from mobile devices, here called UEs, in order to facilitate the power adjustment methods described herein. These measurement reports may include various parameters and are configurable, in some embodiments, but may include radio power and quality for a reference signal from the attached base station, as well as for interfering signals from other base stations. This information can be stored and used to support the power measurement methods described herein. of At step 602, a method for processing measurement reports begins. At step 604, the measurement report is reviewed to determine an identifier for the UE. At step 606, a data store containing past measurement reports is checked for the identifier derived in step 604. The data store may include lists of UEs associated with individual base stations, and may also include lists of UEs that report interference with individual base stations, in some embodiments.

If this UE has not been seen before, processing passes to step 608, where the UE is added to a list of UEs associated with the UE's serving base station. At step 610, the UE is also added to a list of UEs that report interference for any base stations that are marked as interfering in the measurement report. Execution then passes to step A, marked 612.

If the UE has been seen before, execution passes directly to step A, marked 612. Following step A, a parameter known as the serving gateway RSRP, or servRSRP, is updated according to the formula $$servRSRP=(FF)*servRSRP+(1-FF)*newservRSRP,$$

where FF is a weighting factor controlling the rate of change of the servRSRP parameter over time, as new values are added to it.

At step 616, a neighbor count, neiRSRP, is updated, according to the formula $$neiRSRP=(FF)*neiRSRP+(1-FF) * newneiRSRP;$$

where FF is a weighting factor controlling the rate of change of the neiRSRP parameter, as described above.

At step 618, processing stops.

Figure 7:
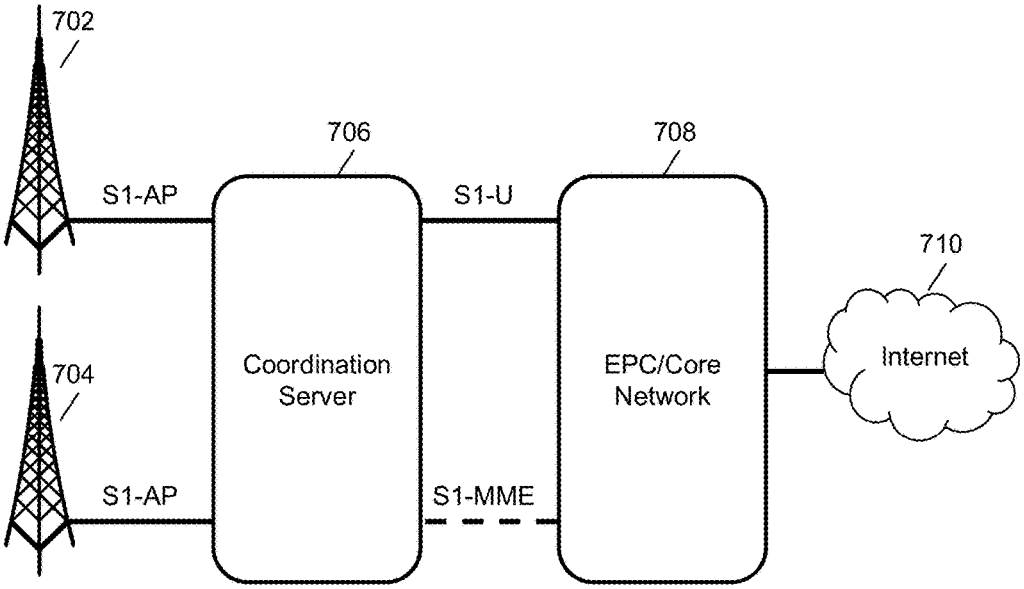
FIG. 7 is a system architecture diagram of an exemplary network configuration, in accordance with some embodiments.

FIG. 7 is a system architecture diagram of an exemplary network configuration, in accordance with some embodiments. Base stations 702 and 704 are connected via an S1-AP interface to coordination server 706. Base stations 702 and 704 are eNodeBs, in some embodiments. Coordination server 706 is connected to the evolved packet core (EPC)/Core Network 708 via an S1 protocol connection and an S1-MME protocol connection. Coordination of base stations 702 and 704 may be performed at the coordination server. In some embodiments, the coordination server may be located within the EPC/Core Network 708. EPC/Core Network 708 provides various LTE core network functions, such as authentication, data routing, charging, and other functions. In some embodiments, mobility management is performed both by coordination server 706 and within the EPC/Core Network 708. EPC/Core Network 708 provides, typically through a PGW functionality, a connection to the public Internet 710.

Figure 8:
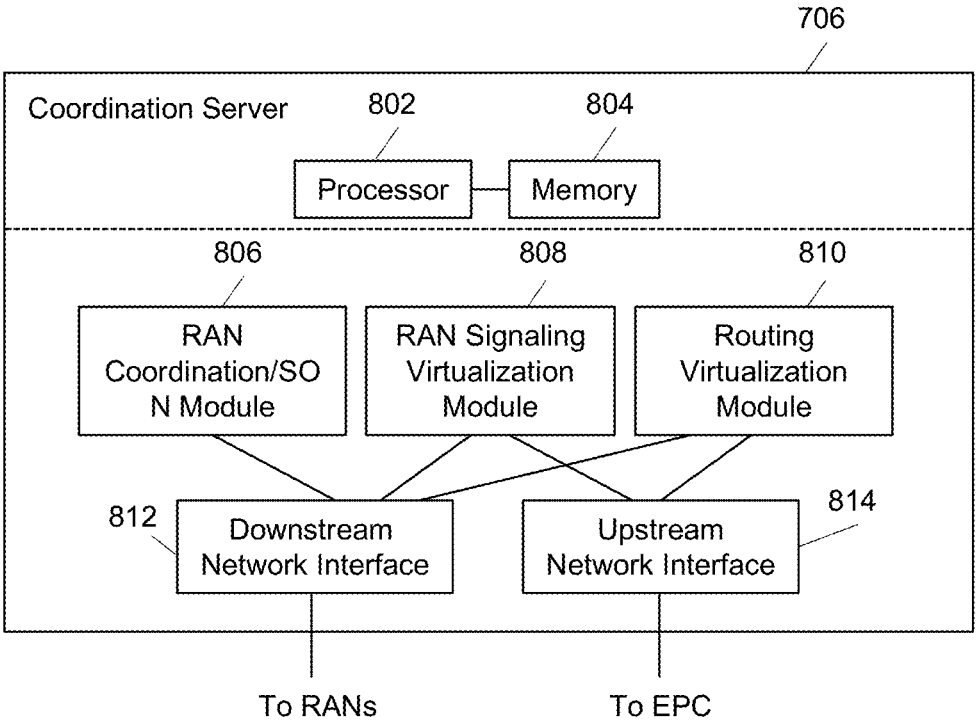
FIG. 8 is a block diagram of an exemplary device for performing a power adjustment method, in accordance with some embodiments.

FIG. 8 is a block diagram of an exemplary device for performing a power adjustment method, in accordance with some embodiments. The coordination server 706 described in FIG. 7 is shown in greater detail. Coordination server 706 includes processor 802 and memory 804, which are configured to provide the functions described herein. Also present are radio access network coordination/self-organized network (RAN Coordination and SON) module 806, RAN signaling virtualization module 808, and routing virtualization module 810. In some embodiments, coordination server 706 may coordinate multiple RANs using coordination module 806. In some embodiments, coordination server may also provide routing virtualization and RAN virtualization, via modules 810 and 808. In some embodiments, a downstream network interface 812 is provided for interfacing with the RANs, which may be a radio interface (e.g., LTE), and an upstream network interface 814 is provided for interfacing with the core network, which may be either a radio interface (e.g., LTE) or a wired interface (e.g., Ethernet).

In some embodiments, certain UEs could be given a preference over others, for example, if they are public safety UEs or if they are in the midst of an emergency or 911 call or data transmission. In these embodiments, the aggregate number of UEs given this preference could be weighted differently at the mapping and summing portion of the algorithm.

In some embodiments, the base stations described herein may be compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, legacy TDD, or other air interfaces used for mobile telephony. In some embodiments, the base stations described herein may support Wi-Fi air interfaces, which may include one of 802.11a/b/g/n/ac. In some embodiments, the base stations described herein may support 802.16 (WiMAX), or other air interfaces. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported.

In some embodiments, the methods described herein for adjustment of power may also be used for adjusting coverage area. In some embodiments, the methods described herein for adjustment of power may also be used for at least one non-LTE radio transmission protocol, such as those described in the preceding paragraph. For example, UMTS also supports a UE-originated measurement report message, and one of skill in the art would understand that this method would be possible to use for both UMTS and LTE, either separately or together. As another example, one of skill in the art would know that signal strength from a mobile device may be inferred via various means, such as by measuring bit error rates in communications with the mobile device, and that the method described herein for adjusting power could be modified to use such inferential signal strength measures to adapt the method for wireless protocols without measurement reporting.

In some embodiments, the methods described herein may be used to provide power adjustment for more than one wireless protocol at one time. Weighting factors may be used, with a decision metric calculated for each protocol, and with an arbitrary weight assigned per protocol reflecting the relative importance of each protocol in the adjustment determination algorithm, such that any proposed adjustment would be made taking into consideration the effects of the adjustment on all of the considered protocols by adding together the weighted decision metrics to form a combined decision metric.

This invention can be a method or it can be a computer readable medium configured to execute the steps described herein. Moreover, the embodiments described herein would be performed on an ongoing basis. In these embodiments, the method steps could be performed periodically, for example, every 30 minutes, hourly, every X number of hours, daily, and so forth. Moreover, base stations within the various networks depicted in FIG. 2 could be from different service providers, using different protocols and so forth if the base stations are multi-RAT nodes.

In some embodiments, the methods and systems described herein may coexist with inter-cell interference coordination (ICIC). Unlike in ICIC, the use of this method allows for reduction of interference without eNodeBs coordinating with each other. Since coordination between eNodeBs is still possible, the two methods may be used in conjunction or independently from one another.

The inventors have understood and appreciated that the method described above for identifying N base stations that may be adjusted in parallel may have similarities to a general network partitioning method, or algorithm. Any other network partitioning method may be used instead of the described method in conjunction with the power adjustment method described herein. Also, the inventors have also appreciated that this network partitioning method and the system described for enabling this method may be used for evaluating and adjusting parameters other than transmit power. For example, this network partitioning method may be used for propagating configuration changes to nodes across the network. First, the network is partitioned into N sub-networks. Next, configuration changes are propagated to a single node within each of the N sub-networks. Next, some delay is allowed to be present such that the adjusted network configuration becomes stable. Then nodes that are neighbors of the previously-identified single node are added to a queue and configured in order. Other embodiments and methods are also apparent to one having skill in the art of network management.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology.

The invention claimed is:

[1. A method for adjusting transmit power in a wireless network, comprising:

identifying a selected base station with a first coverage area for adjustment of transmit power;

identifying a plurality of neighboring base stations with coverage areas nearby the first coverage area;

retrieving a plurality of signal strength measurements from a plurality of mobile devices within the coverage areas of the plurality of neighboring base stations;

calculating a metric corresponding to a number of mobile devices within the coverage areas of the plurality of neighboring base stations that would be positively impacted by a decrease in power at the selected base station;

calculating a first metric corresponding to a number of mobile devices negatively impacted by an increase in power at the selected base station; and sending an instruction, based on the metric, for adjustment of transmit power to the selected base station.]

2. The method of claim [1] *19*, further comprising performing retrieving the plurality of measurements at a coordination server.

3. The method of claim [1] *19*, further comprising retrieving at least one signal strength measurement from at least one mobile device within the first coverage area.

4. The method of claim [1] *19*, further comprising receiving, at a coordination server, measurement reports from the plurality of mobile devices and storing, at the coordination server, the measurement reports indexed by time, originating mobile device, or serving base station of an originating mobile device.

[5. A method for adjusting transmit power in a wireless network, comprising;

identifying a selected base station with a first coverage area for adjustment of transmit power;

identifying a plurality of neighboring base stations with coverage areas nearby the first coverage area;

retrieving a plurality of signal strength measurements from a plurality of mobile devices within the coverage areas of the plurality of neighboring base stations;

receiving, at a coordination server, measurement reports from the plurality of mobile devices;

storing, at the coordination server, the measurement reports indexed by time, originating mobile device, and serving base station of an originating mobile device; and sending an instruction, based on a metric, for adjustment of transmit power to the selected base station, wherein the stored measurement reports are indexed by time, originating mobile device, and serving base station of the originating mobile device.]

6. The method of claim [1] *19*, wherein the plurality of signal strength measurements comprise at least one of Reference Signal Received Power (RSRP) or Reference Signal Received Quality (RSRQ).

7. A method for adjusting transmit power in a wireless network, comprising:

identifying a selected base station with a first coverage area for adjustment of transmit power;

identifying a plurality of neighboring base stations with coverage areas nearby the first coverage area;

retrieving a plurality of signal strength measurements from a plurality of mobile devices within the coverage areas of the plurality of neighboring base stations;

calculating a first metric corresponding to a number of mobile devices within a coverage areas of the plurality of neighboring base stations that would be negatively impacted by an increase in power at the selected base station;

sending an instruction, based on the first metric, for adjustment of transmit power to the selected base station;

subtracting a number of mobile devices that would be positively impacted by the decrease in power from a number of mobile devices that would be negatively impacted by the increase in power to obtain a first net number;

subtracting a number of user equipments reporting deterioration in signal to interference ratio (SINR) by the decrease in power from a number of user equipments reporting improvement in SINR by the increase in power to obtain a second net number; and adding the first net number to the second net number to obtain a final number for determining whether to adjust the transmit power at the selected base station.

8. The method of claim 7, further comprising:

calculating a third metric corresponding to an improvement in signal quality resulting from the increase in power at the selected base station; or calculating a fourth metric corresponding to a reduction in signal quality resulting from a decrease in power at the selected base station.

9. The method of claim 8, further comprising calculating a decision metric based on the first metric, a second metric, the third metric, and the fourth metric, wherein the second metric corresponds to a number of mobile devices positively impacted by the decrease in power at the selected base station.

10. A controller for adjusting transmit power in a wireless network, comprising:

a measurement report data store configured to receive measurement reports from mobile devices and to store the measurement reports indexed by a target base station and by a time; and a processor configured to perform steps comprising:

identifying a selected base station with a first coverage area for adjustment of transmit power;

identifying a plurality of neighboring base stations with coverage areas nearby the first coverage area;

calculating a first metric corresponding to a number of mobile devices within [a] *the* coverage areas of the plurality of neighboring base stations that would be negatively impacted by an increase in power at the selected base station;

calculating a second metric corresponding to a number of mobile devices within the coverage areas of the plurality of neighboring base stations that would be positively impacted by a decrease in power at the selected base station; [and]

sending an instruction for adjustment of transmit power to the selected base station based on the first and the second metric*; and*

*selecting a first set of selected base stations and a second set of selected base stations, such that any power adjustment to any of the first set of selected base stations would not impact any of the second set of selected base stations, thereby enabling performing transmit power adjustment in parallel.*

11. The controller of claim 10, wherein the processor is further configured to perform steps comprising retrieving a plurality of signal strength measurements from a plurality of mobile devices within the coverage areas of the plurality of neighboring base stations.

12. The controller of claim 11, wherein the controller is coupled to a plurality of base stations at a first interface and an evolved packet core at a second interface.

13. The controller of claim 10, wherein the selected base station is an eNodeb.

14. The method of claim 7, further comprising selecting a first set of selected base stations and a second set of selected base stations, such that any power adjustment to any of the first set of selected base stations would not impact any of the second set of selected base stations, thereby enabling performing transmit power adjustments in parallel.

15. The method of claim 14, further comprising selecting the first set of selected base stations such that each of the first set of selected base stations is separated from any base station of the second set of selected base stations by at least a minimum distance number of neighbor nodes; and repeating collecting measurements at a user-selected time interval.

16. The method of claim 7, wherein the increase in power is a multiple of a configurable increment.

17. The method of claim 7, further comprising:

calculating, for each of the plurality of neighboring base stations, a ratio of a reference signal received power at the selected base station versus a reference signal received power at the neighboring base station;

verifying that each ratio is within a user-selected first minimum and first maximum threshold value for the increase in transmit power;

generating a weighted number for each of the plurality of neighboring base stations by multiplying each ratio with a user-selected weight; and adding the plurality of generated weighted numbers to calculate a final weighted number reflecting the number of mobile devices that would be negatively impacted by the increase in transmit power.

18. The method of claim 17, further comprising applying an infinite impulse response filter to the final weighted number to obtain a filtered final weighted number, wherein the filtered final weighted number indicates the number of mobile devices that would be negatively impacted.

19. [The method of claim 1, further comprising:] *A method for adjusting transmit power in a wireless network, comprising:*

*identifying a selected base station with a first coverage area for adjustment of transmit power;*

*identifying a plurality of neighboring base stations with coverage areas nearby the first coverage area;*

*retrieving a plurality of signal strength measurements from a plurality of mobile devices within the coverage areas of the plurality of neighboring base stations;*

*calculating a first metric corresponding to a number of mobile devices within the coverage areas of the plurality of neighboring base stations that would be positively impacted by a decrease in power at the selected base station;*

*calculating a second metric corresponding to a number of mobile devices negatively impacted by an increase in power at the selected base station;*

*sending an instruction, based on the first and second metric, for adjustment of transmit power to the selected base station;* calculating, for each of the plurality of neighboring base stations, a ratio of a reference signal received power at the selected base station versus a reference signal received power at the neighboring base station;

verifying that each ratio is within a user-selected first minimum and first maximum threshold value for the decrease in transmit power; generating a weighted number for each of the plurality of neighboring base stations by multiplying the ratio with a user-selected weight; and adding the plurality of generated weighted numbers to calculate a final weighted number reflecting the number of mobile devices that would be positively impacted by the decrease in transmit power.

20. The method of claim 19, further comprising applying an infinite impulse response filter to the final weighted number to obtain a filtered final weighted number, wherein the filtered final weighted number indicates the number of mobile devices that would be positively impacted.

21. The method of claim 7, further comprising increasing the transmit power at the selected base station if the final number is above a user-selected default, or decreasing the transmit power at the selected base station if the final number is below the user-selected default.

*22. A method for adjusting transmit power in a wireless network, comprising:*

*identifying a selected base station with a first coverage area for adjustment of transmit power;*

*identifying a plurality of neighboring base stations with coverage areas nearby the first coverage area;*

*retrieving a plurality of signal strength measurements from a plurality of mobile devices within the coverage areas of the plurality of neighboring base stations;*

*receiving, at a coordination server, measurement reports from the plurality of mobile devices;*

*storing, at the coordination server, the measurement reports indexed by time, originating mobile device, and serving base station of an originating mobile device;*

*sending an instruction, based on a metric, for adjustment of transmit power to the selected base station; and*

*selecting a first set of selected base stations and a second set of selected base stations, such that any power adjustment to any of the first set of selected base stations would not impact any of the second set of selected base stations, thereby enabling performing transmit power adjustments in parallel.*

*23. The method of claim 22, further comprising selecting the first set of selected base stations such that each of the first set of selected base stations is separated from any base station of the second set of selected base stations by at least a minimum distance number of neighbor nodes; and repeating collecting measurements at a user-selected time interval.*

*24. The method of claim 22, wherein the increase in power is a multiple of a configurable increment.*

*25. The method of claim 22, further comprising:*

*calculating, for each of the plurality of neighboring base stations, a ratio of a reference signal received power at the selected base station versus a reference signal received power at the neighboring base station;*

*verifying that each ratio is within a user-selected first minimum and first maximum threshold value for the increase in transmit power;*

*generating a weighted number for each of the plurality of neighboring base stations by multiplying each ratio with a user-selected weight; and*

*adding the plurality of generated weighted numbers to calculate a final weighted number reflecting the number of mobile devices that would be negatively impacted by the increase in transmit power.*

*26. The method of claim 22, further comprising applying an infinite impulse response filter to a final weighted number to obtain a filtered final weighted number, wherein the filtered final weighted number indicates a number of mobile devices that would be negatively impacted by an adjustment to the transmit power.*

*27. The method of claim 22, further comprising increasing the transmit power at the selected base station if a final number is above a user-selected default, or decreasing the transmit power at the selected base station if the final number is below the user-selected default.*

* * * * *